United States Patent
Kim et al.

(10) Patent No.: US 9,834,204 B2
(45) Date of Patent: Dec. 5, 2017

(54) METHOD FOR LEARNING UPWARDS FRICTION COEFFICIENT OF ENGINE CLUTCH OF HYBRID VEHICLE

(71) Applicant: Hyundai Motor Company, Seoul (KR)

(72) Inventors: Yeon Bok Kim, Gyeonggi-do (KR); Jeong Soo Eo, Gyeonggi-do (KR); Young Joon Chang, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/258,945

(22) Filed: Sep. 7, 2016

(65) Prior Publication Data

US 2017/0166201 A1      Jun. 15, 2017

(30) Foreign Application Priority Data

Dec. 14, 2015   (KR) .................. 10-2015-0178583
Jul. 21, 2016   (KR) .................. 10-2016-0092910

(51) Int. Cl.
*B60W 20/50*    (2016.01)
*B60K 6/387*    (2007.10)
*B60W 20/40*    (2016.01)
*F16D 48/06*    (2006.01)
*B60K 6/46*     (2007.10)

(52) U.S. Cl.
CPC ............ *B60W 20/50* (2013.01); *B60K 6/387* (2013.01); *B60W 20/40* (2013.01); *F16D 48/06* (2013.01); *B60K 6/46* (2013.01); *B60W 2510/0291* (2013.01); *B60W 2710/025* (2013.01); *Y10S 903/914* (2013.01); *Y10S 903/946* (2013.01)

(58) Field of Classification Search
CPC ....... B60W 20/50; B60W 20/40; B60K 6/387; F16D 48/06
See application file for complete search history.

(56) References Cited

U.S. PATENT DOCUMENTS

2015/0073673 A1*   3/2015   Hata ................. F16D 48/06
                                                        701/68

FOREIGN PATENT DOCUMENTS

JP    2014-061750 A    4/2014
JP    2015-051727 A    3/2015
KR    10-1371461 B1    3/2014

* cited by examiner

*Primary Examiner* — Basil T. Jos
(74) *Attorney, Agent, or Firm* — Mintz Levin Cohn Ferris Glovsky and Popeo, P.C.; Peter F. Corless

(57) ABSTRACT

A method for learning an upwards friction coefficient of an engine clutch of a hybrid vehicle includes: after the engine clutch is engaged, disengaging, by a controller, the engine clutch which connects an engine with a motor or disconnects the engine from the motor; when the engine clutch is disengaged, comparing, by the controller, a temperature of the engine clutch with a threshold value; and when the temperature of the engine clutch is less than the threshold value, increasing, by the controller, a friction coefficient of the engine clutch up to a certain value.

7 Claims, 5 Drawing Sheets

METHOD FOR LEARNING UPWARDS FRICTION COEFFICIENT OF ENGINE CLUTCH OF HYBRID VEHICLE

CROSS-REFERENCE TO RELATED APPLICATIONS

This application claims under 35 U.S.C. §119(a) the benefit of Korean Patent Application No. 10-2015-0178583 filed in the Korean Intellectual Property Office on Dec. 14, 2015 and Korean Patent Application No. 10-2016-0092910 filed in the Korean Intellectual Property Office on Jul. 21, 2016, the entire contents of which are incorporated herein by reference.

BACKGROUND (a) Technical Field

The present invention relates to a hybrid vehicle (or a hybrid electric vehicle), and more particularly, to a method for learning an upwards friction coefficient of an engine clutch of a hybrid vehicle.

(b) Description of the Related Art

An environmentally-friendly vehicle includes a fuel cell vehicle, an electric vehicle, a plug-in electric vehicle, and a hybrid vehicle, and typically includes a motor to generate driving force.

A hybrid vehicle, which is an example of the environmentally-friendly vehicle, uses an internal combustion engine and power of a battery together. In other words, the hybrid vehicle efficiently combines and uses power of the internal combustion engine and power of a motor.

The hybrid vehicle can include an engine, a motor, an engine clutch to adjust power between the engine and the motor, a transmission, a differential gear apparatus, a battery, a starter-generator that starts the engine or generates electricity by output of the engine, and wheels.

Further, the hybrid vehicle can include a hybrid control unit (HCU) for controlling an entire operation of the hybrid vehicle, an engine control unit (ECU) for controlling an operation of the engine, a motor control unit (MCU) for controlling an operation of the motor, a transmission control unit (TCU) for controlling an operation of the transmission, and a battery control unit (BCU) for controlling and managing the battery.

The battery control unit can be called a battery management system (BMS). The starter-generator can be called an integrated starter and generator (ISG) or a hybrid starter and generator (HSG).

The hybrid vehicle can be driven in a driving mode, such as an electric vehicle (EV) mode, which is an electric vehicle mode using only power of the motor, a hybrid vehicle (HEV) mode, which uses rotational force of the engine as main power and uses rotational force of the motor as auxiliary power, and a regenerative braking (RB) mode for collecting braking and inertial energy during driving by braking or inertia of the vehicle through electricity generation of the motor to charge the battery.

It is possible to ensure drivability of the hybrid vehicle by engaging the engine clutch after a speed of the engine and a speed of the motor are synchronized to maintain a constant torque during power transmission between the engine and the motor, when changing from the EV mode to the HEV mode.

However, it is necessary to control the engine clutch to slip and be engaged under driving conditions when the battery is maintained in a low State of Charge (SOC), when the temperatures of the battery and the motor are above a reference temperature condition, and when the road that the vehicle travels on has a steep slope. Additionally, it is necessary to control the pressure of the clutch to control the engine clutch to slip under the driving conditions.

Delivery torque of the engine clutch, which is torque transmitted by physical contact of two friction members that are included in the engine clutch, can be estimated from hydraulic pressure supplied to the engine clutch and the friction coefficient of the friction members.

Controlling the engine clutch is an important factor that determines the drivability and the fuel consumption in operation of the hybrid vehicle. The friction coefficient can be changed by a deviation in hydraulic pressure depending on a current provided to a solenoid valve operating the engine clutch, aging of the solenoid valve, and degradation of the friction members. A change of the friction coefficient can cause a deviation in the delivery torque of the engine clutch.

As described above, it is difficult to precisely control the engine clutch in the hybrid vehicle because a deviation is generated by deterioration of the parts included in the engine clutch, thereby decreasing drivability and fuel economy. Accordingly, it may be necessary to correct the deviation by learning the delivery torque of the engine clutch in the hybrid vehicle.

The above information disclosed in this Background section is only for enhancement of understanding of the background of the invention and therefore it may contain information that does not form the prior art that is already known in this country to a person of ordinary skill in the art.

SUMMARY

The present invention provides a method for learning an upwards friction coefficient of an engine clutch of a hybrid vehicle which is capable of learning the friction coefficient of the engine clutch to improve drivability and fuel efficiency of the vehicle when the engine clutch is engaged or disengaged (e.g., released).

An exemplary embodiment of the present invention provides a method for learning an upwards friction coefficient of an engine clutch of a hybrid vehicle, including: after the engine clutch is engaged, disengaging, by a controller, the engine clutch which connects an engine with a motor or disconnects the engine from the motor; when the engine clutch is disengaged, comparing, by the controller, a temperature of the engine clutch with a threshold value; and when the temperature of the engine clutch is less than the threshold value, increasing, by the controller, a friction coefficient of the engine clutch up to a certain value.

The method for learning the upwards friction coefficient of the engine clutch of the hybrid vehicle may further include: when the temperature of the engine clutch is not less than the threshold value, maintaining, by the controller, the friction coefficient of the engine clutch.

The engine clutch may include a dry type engine clutch.

The method for learning the upwards friction coefficient of the engine clutch of the hybrid vehicle may further include: before the engine clutch is disengaged after the engine clutch is engaged, determining, by the controller, whether the engine clutch is broken. When the engine clutch is broken, the controller may fix the friction coefficient as a minimum value.

When the engine clutch is not broken, the controller may initialize the friction coefficient.

The method for learning the upwards friction coefficient of the engine clutch of the hybrid vehicle may further include: after the friction coefficient is initialized, determining, by the controller, whether an amount of slip which is a torque difference that occurs due to a difference between a friction coefficient of the engine clutch that the controller recognizes and a friction coefficient that is generated in the engine clutch is greater than a minimal amount of slip for learning downwards friction coefficient of the engine clutch. When the amount of slip is greater than the minimal amount, the controller may lower the friction coefficient.

The method for learning the upwards friction coefficient of the engine clutch of the hybrid vehicle according to the exemplary embodiment of the present invention may prevent intentional slip for learning the upwards friction coefficient, thereby improving drivability and fuel efficiency of the vehicle.

A non-transitory computer readable medium containing program instructions executed by a processor can include: program instructions that, after an engine clutch is engaged, disengage the engine clutch which connects an engine with a motor or disconnects the engine from the motor; program instructions that, when the engine clutch is disengaged, compare a temperature of the engine clutch with a threshold value; and program instructions that, when the temperature of the engine clutch is less than the threshold value, increase a friction coefficient of the engine clutch up to a certain value.

BRIEF DESCRIPTION OF THE DRAWINGS

A brief description of the drawings will be provided to more sufficiently understand the drawings which are used in the detailed description of the present invention.

DETAILED DESCRIPTION OF THE EMBODIMENTS

Figure 1:
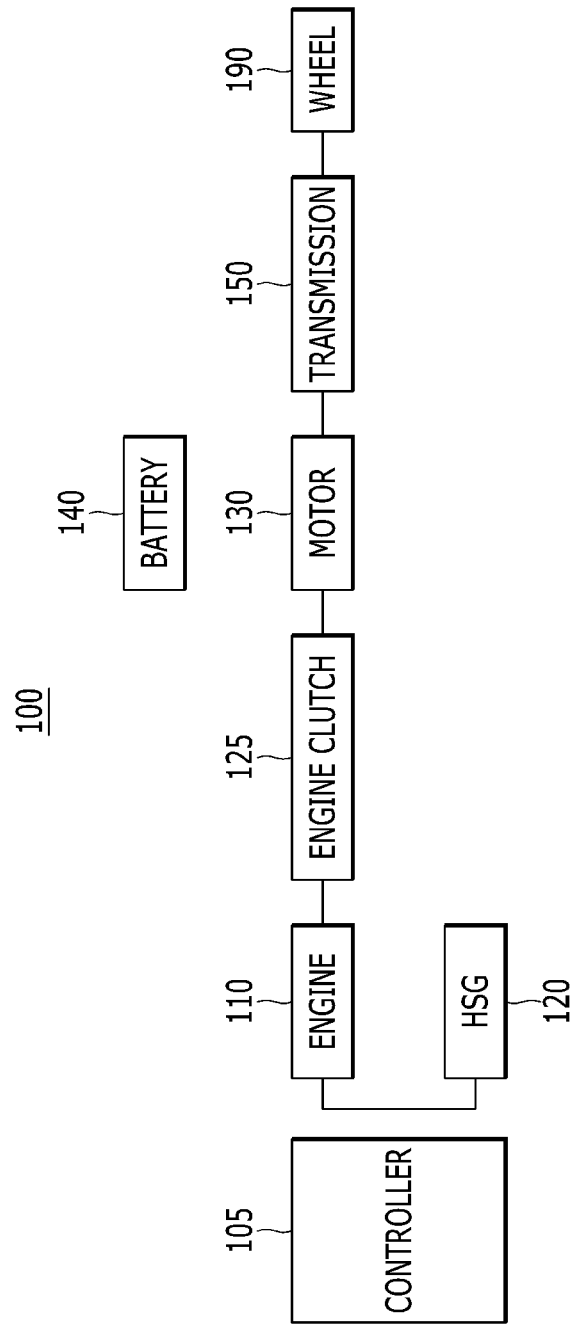
FIG. 1 is a view for explaining a hybrid vehicle including a device for learning an upwards friction coefficient of an engine clutch according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", and "module" described in the specification mean units for processing at least one function and operation, and can be implemented by hardware components or software components and combinations thereof.

Further, the control logic of the present invention may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

A dry type engine clutch that transmits engine power of a parallel type hybrid vehicle to a wheel should estimate a friction coefficient of the engine clutch in order to maintain a correct torque transmission response as compared with a wet type engine clutch, and thus a method for estimating a friction coefficient of the dry type engine clutch is required.

Friction coefficient adaptation (or friction coefficient learning) for the dry type engine clutch that is included in a hybrid vehicle having a transmission electric mounted device (TMED) type, which is a related art, is explained as follows. Learning a downwards friction coefficient of the engine clutch, which is downward learning of a friction coefficient and an unintentional learning, is learning of the friction coefficient that is performed when slip (i.e., a transfer torque difference) of the engine clutch that occurs due to a difference between a friction coefficient that is generated in the engine clutch hardware (HW) and a friction coefficient that is generated (or recognized) in a software (SW) controlling the engine clutch is generated. For example, when engine torque is 90 Nm, transfer torque that the SW recognizes is 90 Nm, and transfer torque of the HW is 80 Nm, 10 Nm of slip (i.e., slip amount or slip ratio) occurs, and downward learning of the SW is carried out.

Learning an upwards friction coefficient of the engine clutch, which is upward learning of a friction coefficient and an intentional learning, is learning of the friction coefficient that is performed when a slip amount is insufficient after an intentional slip is generated. For example, when the engine torque is 90 Nm, transfer torque that the SW recognizes is 70 Nm, and transfer torque of the HW is 80 Nm, 20 Nm of slip is expected after intentional slip is generated but only 10 Nm of slip actually occurs. Accordingly, upward learning of the friction coefficient is carried out.

The friction coefficient is often changed because there is change in temperature on a surface on the clutch when the engine is engaged or disengaged (or released) during a driving of a hybrid vehicle because of a characteristic of the dry type engine clutch, and thus the upward learning that generates intentional slip and follows the changed friction coefficient should be frequently carried out. However, generation of slip according to a frequent upward learning has a negative influence on drivability and fuel efficiency of the vehicle.

FIG. 1 is a view for explaining a hybrid vehicle including a device for learning an upwards friction coefficient of an engine clutch according to an exemplary embodiment of the present invention.

Referring to FIG. 1, the hybrid vehicle 100 includes a controller 105, an engine 110, a hybrid starter-generator (HSG) 120, an engine clutch 125, a motor (or a driving motor) 130 which may be an electric motor, a battery 140, a transmission 150, and wheels (or driving wheels) 190.

The device for learning an upwards friction coefficient of the engine clutch of the hybrid vehicle may include the controller 105 and the engine clutch 125.

The hybrid vehicle 100, which is a hybrid electric vehicle, may use the engine 110 and the motor 130 as power sources, and includes the engine clutch 125 existing between the engine 110 and the motor 130 so that the hybrid vehicle 100 may be operated in an electric vehicle (EV) mode in which the hybrid vehicle 100 travels by the motor 130 in a state where the engine clutch 125 is opened, and in a hybrid electric vehicle (HEV) mode in which the hybrid vehicle 100 is capable of travelling by both the motor 130 and the engine 110 in a state where the engine clutch 125 is closed.

The hybrid vehicle 100 may include a power train of a transmission mounted electric device (TMED) type in which the motor 130 is connected to the transmission 150. The hybrid vehicle 100 may provide a driving mode, such as the EV mode, which is the electric vehicle mode using only power of the motor, and the HEV mode, which uses rotational force of the engine as main power and uses rotational force of the motor as auxiliary power depending on whether the engine clutch 125 that is disposed between the engine 110 and the motor 130 is engaged (or connected). In particular, in the hybrid vehicle 100 including a structure in which the motor 130 may be directly connected to the transmission 150, revolutions per minute (RPM) of the engine may be increased by drive of the HSG 120, power delivery and power cutoff between the engine and the motor may be performed via engagement and release of the clutch 125, a driving force may be transmitted (or transferred) to the wheels 190 through a power transmission system which may include the transmission 150, and torque of the engine may be transmitted to the motor via engagement of the clutch 125 when transmission of the engine torque is requested.

The controller 105 may include a hybrid control unit (HCU), a motor control unit (MCU), an engine control unit (ECU), and a transmission control unit (TCU).

The HCU may control starting of the engine by controlling the HSG 120 when the engine 110 stops. The HCU may be the highest controller, and may synthetically control controllers (for example, the MCU) connected to a network such as a controller area network (CAN) which is a vehicle network, and may control overall operation of the hybrid vehicle 100.

The MCU may control the HSG 120 and the motor 130. The MCU may control an output torque of the driving motor 130 through the network depending on the control signal output from the HCU, and thus may control the motor to operate at maximum efficiency. The MCU may include an inverter configured as a plurality of power switching elements. A power switching element included in the inverter may include an insulated gate bipolar transistor (IGBT), a field effect transistor (FET), a metal oxide semiconductor FET (MOSFET), a transistor, or a relay. The inverter converts a direct current (DC) voltage that is supplied from the battery 140 into a three-phase alternating current (AC) voltage to drive the driving motor 130. The MCU may be disposed between the battery 140 and the motor 130.

The ECU may control a torque of the engine 110. The ECU may control an operating point (or a driving point) of the engine 110 through the network depending on a control signal output from the HCU, and may control the engine to output an optimal torque. The TCU may control an operation of the transmission 150.

After the engine clutch 125 is engaged, the controller 105 may disengage the engine clutch which connects the engine with the motor or disconnects the engine from the motor. When the engine clutch is disengaged, the controller 105 may compare a temperature of the engine clutch with a threshold value (or a reference value). If the temperature of the engine clutch is less than the threshold value, the controller 105 may increase a friction coefficient of the engine clutch up to a certain value (or a predetermined value) (e.g., 0. 0.001). When the temperature of the engine clutch is not less than the threshold value, the controller 105 may maintain the friction coefficient of the engine clutch.

Before the engine clutch 125 is disengaged after the engine clutch is engaged, the controller 105 may determine whether the engine clutch is broken (or faulty). When the engine clutch fails, the controller 105 may fix the friction coefficient as a minimum value. When the engine clutch does not fail, the controller 105 may, for example, initialize the friction coefficient as 0.27.

After the friction coefficient is initialized, the controller 105 may determine whether an amount of slip which is a torque difference that occurs due to a difference between a friction coefficient of the engine clutch 125 that the controller 105 recognizes and a friction coefficient that is generated in the engine clutch is greater than a minimal amount (e.g., 5 Nm) of slip for learning a downwards friction coefficient of the engine clutch. When the amount of slip is greater than the minimal amount, the controller 105 may lower the friction coefficient.

For example, the controller 105 may be one or more microprocessors operated by a program or hardware including the microprocessor. The program may include a series of commands for executing a method for learning an upwards friction coefficient of the engine clutch of the hybrid vehicle according to an exemplary embodiment of the present invention, which will be described below.

The engine 110 may include a diesel engine, a gasoline engine, a liquefied natural gas (LNG) engine, or a liquefied petroleum gas (LPG) engine, and may output a torque at the operating point depending on a control signal output from the ECU. The torque may be combined with driving force of the driving motor 130 in the HEV mode.

The HSG 120 may operate as a motor depending on a control signal output from the MCU to start the engine 110, and may operate as a generator in a state in which start of the engine 110 is maintained to provide generated electric power to the battery 140 via the inverter.

The engine clutch 125 may be disposed (or mounted) between the engine 110 and the driving motor 130, and may be operated to switch power delivery between the engine 110 and the motor 130. The engine clutch 125 may connect or intercept power between the engine and the motor depending on switching of the HEV mode and the EV mode. The engine clutch 125, which is a device for transmitting the engine torque to the wheel, may include a wet type engine clutch or a dry type engine clutch. Operation of the engine clutch 125 may be controlled by the controller 105.

The engine clutch 125 may be engaged by pressure of a fluid (e.g., oil) that is supplied to the engine clutch 125. The pressure of fluid for engaging the engine clutch 125 may be pressure above the kiss point that is a start engagement pressure of the engine clutch, and may be controlled by the controller 105. The kiss point may be a starting point of torque delivery, and may be the pressure of the fluid that converts a state of the engine clutch into a slip state in which the clutch starts friction. The kiss point may mean an initial hydraulic pressure by which torque is started to be transmitted as two friction members included in the engine clutch 125 are in contact with each other. A slip state of the engine clutch 125 may be started at the kiss point.

An open state of the clutch may mean a state in which both ends of the engine clutch do not interfere with each other, and the engine clutch is physically separated. A slip state of the clutch may mean a state in which the clutch starts friction and a speed difference between both ends is above a predetermined value. A lock-up state of the clutch may mean a state in which there is no speed difference between both ends, and 100% torque applied to the input of the clutch is transferred to output of the clutch.

The motor 130 may be operated by a three-phase AC voltage that is output from the MCU to generate a torque. The motor 130 may be operated as a generator during coasting drive or regenerative braking to supply a voltage (or regenerative energy) to the battery 140.

The battery 140 may include a plurality of unit cells. A high voltage for providing a driving voltage (for example, 350-450 V DC) to the motor 130 that provides driving power to the wheels 190 may be stored in the battery 140.

The transmission 150 may include a multiple speed transmission, such as an automatic transmission or a dual clutch transmission (DCT), or a continuously variable transmission (CVT), and may shift to a desired gear by using hydraulic pressure depending on control of the TCU to operate engagement elements and disengagement elements. The transmission 150 may transmit driving force of the engine 110 and/or the motor 130 to the wheels 190, and may intercept power delivery between the motor 130 (or the engine 110) and the wheels 190. The transmission 150 may include a gearbox.

Figure 2:
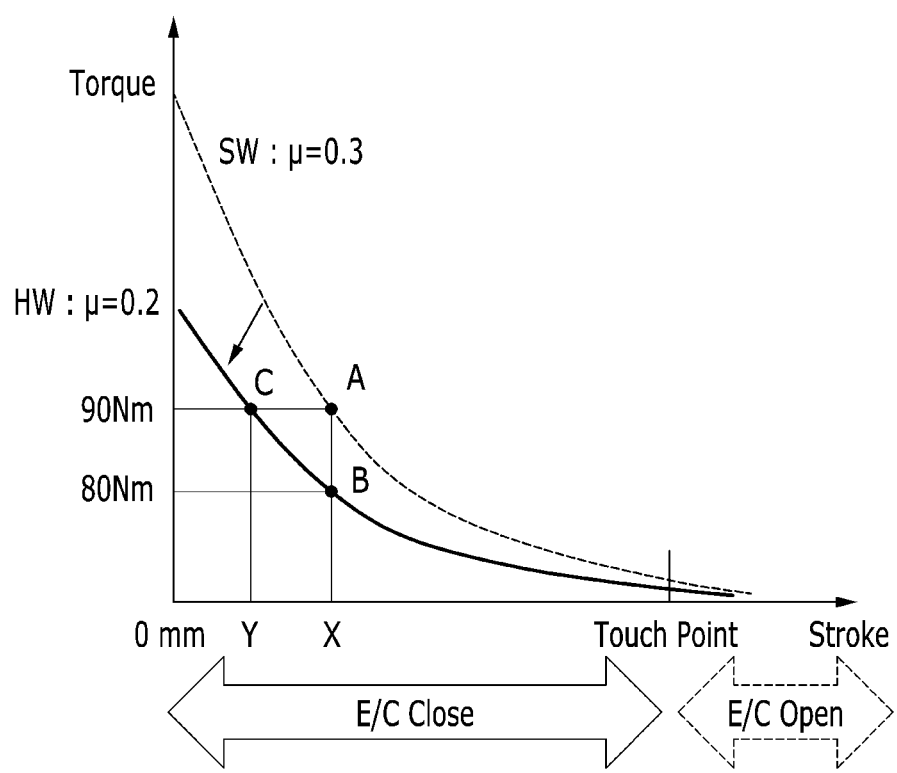
FIG. 2 is a view describing an example of a method for learning a downwards friction coefficient of an engine clutch.

FIG. 2 is a view describing an example of the method for learning downwards friction coefficient of the engine clutch. FIG. 2 is a torque-stoke (T-S) curve of a hydrostatic clutch actuator (or a hydraulic pressure clutch actuator) included in the dry type engine clutch that is a normally closed type clutch.

Referring to FIG. 2, a dotted line shown in FIG. 2 is the T-S curve that a software (SW) controlling the engine clutch (or an engine clutch system) recognizes and a solid line is the T-S curve of actual engine clutch hardware (HW). In the SW, a friction coefficient of the engine clutch is learned as 0.3 and in the HW the friction coefficient is leaned as 0.2.

If 90 Nm of torque (point A) is input to the engine clutch by the engine when the engine clutch (E/C) is engaged (or closed), the SW controls the actuator so that the friction member of the engine clutch moves X mm that can deliver 90 Nm of torque. However, because torque which the hardware (HW) can actually transfer at X mm is 80 Nm (point B), 10 Nm of slip occurs. When the slip occurs, the SW determines that the friction coefficient is incorrect (or wrong). The SW controls the actuator so that the friction member of the engine clutch moves Y mm (point C) at which the slip does not occur, and the SW calculates a new friction coefficient (or a new T-S curve slope) as shown in the equation below based on the kiss point (or a touch point).

$$T = FC * T{nominal} + \alpha$$

In the equation, the FC may indicate the friction coefficient, the Tnominal may indicate torque at point X, and the α may be a torque when a stroke is 0. The stroke may mean a distance to which the actuator moves the friction member included in the engine clutch.

Figure 3:
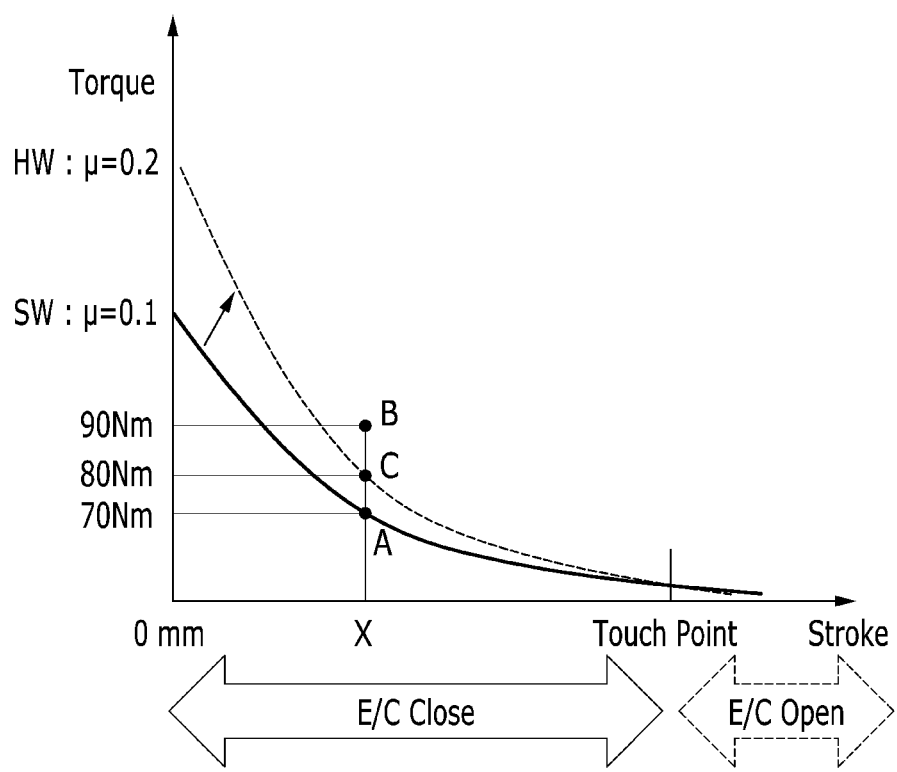
FIG. 3 is a view describing an example of a method for learning an upwards friction coefficient of an engine clutch.

FIG. 3 is a view describing an example of a method for learning an upwards friction coefficient of the engine clutch. FIG. 3 is a torque-stoke (T-S) curve of the hydrostatic clutch actuator included in the dry type engine clutch that is the normally closed type clutch.

Referring to FIG. 3, a solid line shown in FIG. 3 is the T-S curve that a software (SW) controlling the engine clutch (or the engine clutch system) recognizes and a dotted line is the T-S curve of actual engine clutch hardware (HW). In the SW, a friction coefficient of the engine clutch is learned as 0.1 and in the HW the friction coefficient is leaned as 0.2.

When an input torque that is applied to the engine clutch by the engine is 90 Nm (point B) at X mm point (point A) at which the SW determines that 70 Nm of torque can be transferred, amount of slip corresponding to Δ20 Nm is expected. However, torque that the HW can actually transfer is 80 Nm (point C), and thus Δ10 Nm of slip occurs by the equation below.

The slip amount=a difference between the engine speed and the motor speed*the engine clutch transfer torque The SW checks actual torque that is currently transferred based on the slip amount and calculates a new friction coefficient (or a new T-S curve slope) based on the kiss point (or the touch point).

Figure 4:
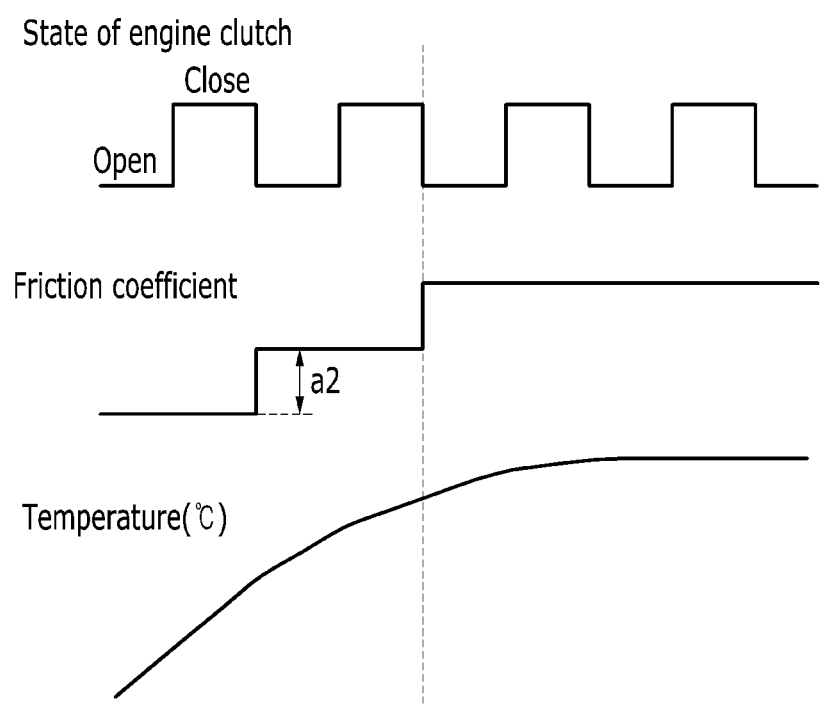
FIG. 4 is a view for explaining a method for learning the upwards friction coefficient of the engine clutch shown in FIG. 1.

FIG. 4 is a view for explaining the method for learning the upwards friction coefficient of the engine clutch shown in FIG. 1.

Referring to FIG. 4, when the engine clutch 125 is released (or opened) after the engine clutch is engaged (or closed), the friction efficient may be increased by a predetermined amount (e.g., +α2). A characteristic of the friction coefficient of the engine clutch may be changed depending on temperature of the engine clutch, a temperature of a hydraulic pressure line (or a hydraulic pipe) that is disposed between the engine clutch and the hydrostatic clutch actuator, or temperatures of the engine and the motor around the engine clutch, and thus increase an amount of the friction coefficient according to the temperature.

For example, the friction coefficient may be increased by +0.001 when the temperature is low or lower than a predetermined temperature, and the friction coefficient may be kept the same when the temperature is equal to or higher than the predetermined temperature. In other words, when the temperature is equal to or greater than a certain value, there may be no increase in the friction coefficient.

Upward learning of the friction coefficient may be performed only within a set range of the friction coefficient. Accordingly, an abnormal operation (e.g., excessive slip) due to wrong learning may be prevented.

When the hybrid vehicle 100 prepares upward learning of the friction coefficient by turning an ignition key of the vehicle and the engine clutch 125 does not fail, the friction coefficient may be reset to an initial value. For example, the initial value may be 0.27 that is a general friction coefficient value of the dry type engine clutch. Therefore, a characteristic of the friction coefficient due to soaking (or neglectedness) may be initialized (or reset).

When the hybrid vehicle 100 prepares upward learning of the friction coefficient by turning an ignition key of the vehicle and the engine clutch 125 fails, the friction coefficient may be fixed as a small friction coefficient value that does not generate an open state of the engine clutch in order to prevent abnormal friction coefficient learning and learning of the friction coefficient may be not performed.

A method for learning downwards friction coefficient of the engine clutch according to an exemplary embodiment of the present invention may use the method described with reference to FIG. 2.

As described above, the embodiment of the present invention may increase the friction coefficient by the certain value (e.g., +0.001) when the engine clutch is released after the engine clutch is engaged instead of upward learning using intentional slip, and after a certain time, the embodiment of the present invention may perform downward learning according to a friction coefficient difference between the engine clutch hardware (HW) and the software (SW) that is a program included in the controller 105 controlling the engine clutch 125. If a characteristic of the hybrid vehicle system (or the engine clutch system) is stabilized depending on change in the temperature after the hybrid vehicle travels during a certain time, the embodiment of the present invention may limit increase of the friction coefficient and may prevent the slip by using additional downward learning.

Figure 5:
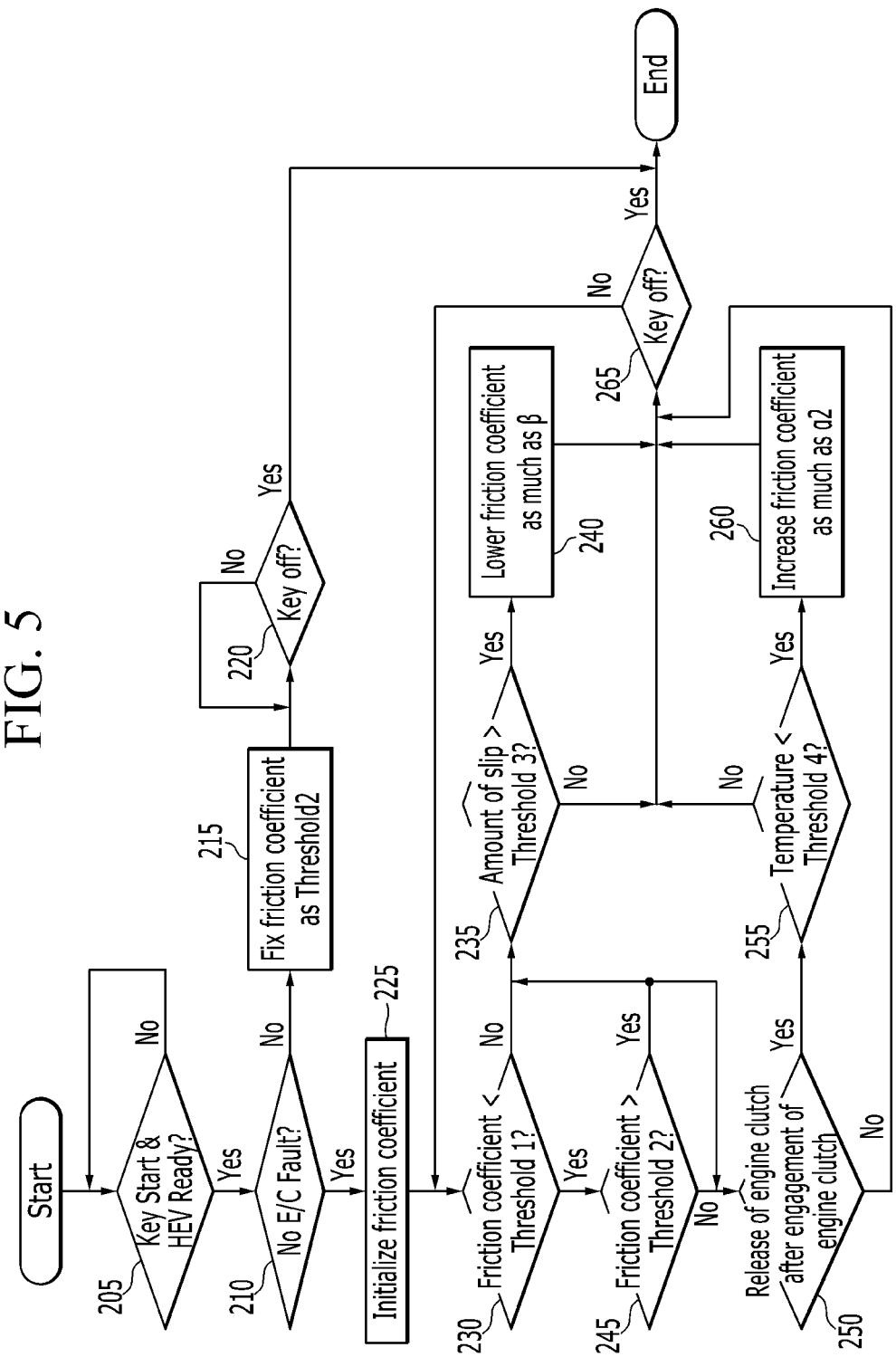
FIG. 5 is a flowchart describing a method for learning the upwards friction coefficient of the engine clutch of the hybrid vehicle according to another exemplary embodiment of the present invention.

FIG. 5 is a flowchart describing a method for learning the upwards friction coefficient of the engine clutch of the hybrid vehicle according to another exemplary embodiment of the present invention.

Referring to FIG. 5, in a learning waiting step 205, the controller 105 may determine (or check) whether the hybrid vehicle 100 is in a standby state for friction coefficient learning by turning an ignition key (or a start key) of the vehicle.

According to an engine clutch failure judging step 210, the controller 105 may use a sensor to determine whether the engine clutch 125 is in a failure state when the hybrid vehicle 100 is in the standby state for friction coefficient learning.

According to a friction coefficient fixing step 215, when the engine clutch fails, the controller 105 may fix the friction coefficient value of the engine clutch 125 as a second threshold value (Threshold 2) for upward learning of the friction coefficient. The Threshold 2 may be a minimum value of the friction coefficient.

According to an ignition key-off checking step 220, when the friction coefficient value is fixed as the Threshold 2, the controller 105 may check (or determine) whether the ignition key of the hybrid vehicle 100 is turned off so that friction coefficient learning of the hybrid vehicle 100 is terminated.

According to an initialization step 225, when the engine clutch 125 does not fail, the controller 105 the controller 105 may, for example, initialize the friction coefficient as 0.27.

According to a comparison step 230, after the friction coefficient is initialized, the controller 105 may determine whether the friction coefficient is less than a first threshold value (Threshold 1) for upward learning of the friction coefficient. The Threshold 1 may be a maximum value of the friction coefficient.

According to a comparison step 235, when the friction coefficient is not less than the first threshold value (Threshold 1), the controller 105 may determine whether the slip amount is greater than a third threshold value (Threshold 3). The Threshold 3 may, for example, be 5 Nm and may be the minimal amount of slip that generates downward learning.

According to a friction coefficient lowering step 240, when the slip amount of the friction coefficient is greater than the third threshold value (Threshold 3), the controller 105 may lower the friction coefficient by $\beta$. The $\beta$ value may be determined according to the slip amount.

According to an ignition key-off checking step 265, when the slip amount of the friction coefficient is not greater than the third threshold value (Threshold 3) and the friction coefficient value is lowered, the controller 105 may check whether the ignition key of the hybrid vehicle 100 is turned off so that friction coefficient learning of the hybrid vehicle 100 is terminated. When the ignition key is not turned off, a process that is the method for learning the upwards friction coefficient of the engine clutch of the hybrid vehicle proceeds to the comparison step 230.

According to a comparison step 245, when the friction coefficient is less than the first threshold value (Threshold 1), the controller 105 may determine whether the friction coefficient is greater than the second threshold value (Threshold 2) for upward learning of the friction coefficient. The Threshold 2 may be the minimum value of the friction coefficient. When the friction coefficient is greater than the second threshold value (Threshold 2), the process that is the method for learning the upwards friction coefficient of the engine clutch of the hybrid vehicle proceeds to the comparison step 235 and a release determining step 250.

According to the release determining step 250, the controller 105 may determine whether the engine clutch 125 is released after the engine clutch 125 is engaged. When the engine clutch 125 is not released after the engine clutch 125 is engaged, the process proceeds to the ignition key-off checking step 265.

According to a comparing step 255, when the engine clutch 125 is released after the engine clutch 125 is engaged, the controller 105 may determine whether the temperature is less than a fourth threshold value (Threshold 4). The Threshold 4 is a maximum value of the temperature that performs upward learning of the friction coefficient. The temperature may include a temperature of the engine clutch, a temperature of the hydraulic pressure line (or a hydraulic pipe) that is disposed between the engine clutch and the hydrostatic clutch actuator, or temperatures of the engine 110 and the motor 130 around the engine clutch. The hydrostatic clutch actuator may apply hydraulic pressure to the hydraulic pressure line so that the friction members included in the engine clutch 125 may be moved and then the engine clutch may be engaged or released.

According to a friction coefficient increasing step 260, when the temperature is less than the fourth threshold value (Threshold 4), the controller 105 may increase the friction coefficient by $\alpha 2$ based on the slip amount. For example, the $\alpha 2$ value may be 0.001.

When the temperature is not less than the fourth threshold value (Threshold 4) and the friction coefficient value is increased, the process proceeds to the ignition key-off checking step 265.

The method for learning the upwards friction coefficient of the engine clutch is described in more detail as follows.

When the friction coefficient is not less than the first threshold value (Threshold 1), upward learning of the friction coefficient may be prohibited, and downward learning of the friction coefficient may be allowed.

When the friction coefficient is greater than the second threshold value (Threshold 2) and the friction coefficient is less than the first threshold value (Threshold 1), upward learning of the friction coefficient may be allowed, and downward learning of the friction coefficient may be allowed.

When the friction coefficient is not less than the second threshold value (Threshold 2), upward learning of the friction coefficient may be allowed, and downward learning of the friction coefficient may be prohibited.

The components, "~ unit", block, or module which are used in the present exemplary embodiment may be implemented in software such as a task, a class, a subroutine, a process, an object, an execution thread, or a program which is performed in a predetermined region in the memory, or hardware such as a field programmable gate array (FPGA) or an application-specific integrated circuit (ASIC), and may be performed with a combination of the software and the hardware. The components, '~ part', or the like may be embedded in a computer-readable storage medium, and some part thereof may be dispersedly distributed in a plurality of computers.

As set forth above, exemplary embodiments have been disclosed in the accompanying drawings and the specification. Herein, specific terms have been used, but are just used for the purpose of describing the present invention and are not used for qualifying the meaning or limiting the scope of the present invention, which is disclosed in the appended claims. Therefore, it will be understood by those skilled in the art that various modifications and equivalent exemplary embodiments are possible from the present invention. Accordingly, the actual technical protection scope of the present invention must be determined by the spirit of the appended claims.

What is claimed is:

1. A method for learning an upwards friction coefficient of an engine clutch of a hybrid vehicle, comprising:
   after the engine clutch is engaged, disengaging, by a controller, the engine clutch which connects an engine with a motor or disconnects the engine from the motor;
   when the engine clutch is disengaged, comparing, by the controller, a temperature of the engine clutch with a threshold value; and
   when the temperature of the engine clutch is less than the threshold value, increasing, by the controller, a friction coefficient of the engine clutch up to a certain value.

2. The method of claim 1, further comprising:
   when the temperature of the engine clutch is not less than the threshold value, maintaining, by the controller, the friction coefficient of the engine clutch.

3. The method of claim 1, wherein the engine clutch includes a dry type engine clutch.

4. The method of claim 1, further comprising:
   before the engine clutch is disengaged after the engine clutch is engaged, determining, by the controller, whether the engine clutch is broken,
   wherein when the engine clutch is broken, the controller fixes the friction coefficient as a minimum value.

5. The method of claim 4, wherein when the engine clutch is not broken, the controller initializes the friction coefficient.

6. The method of claim 5, further comprising:
   after the friction coefficient is initialized, determining, by the controller, whether an amount of slip which is a torque difference that occurs due to a difference between a friction coefficient of the engine clutch that the controller recognizes and a friction coefficient that is generated in the engine clutch is greater than a minimal amount of slip for learning a downwards friction coefficient of the engine clutch,
   wherein when the amount of slip is greater than the minimal amount, the controller lowers the friction coefficient.

7. A non-transitory computer readable medium containing program instructions executed by a processor, the computer readable medium comprising:
   program instructions that, after an engine clutch is engaged, disengage the engine clutch which connects an engine with a motor or disconnects the engine from the motor;
   program instructions that, when the engine clutch is disengaged, compare a temperature of the engine clutch with a threshold value; and
   program instructions that, when the temperature of the engine clutch is less than the threshold value, increase a friction coefficient of the engine clutch up to a certain value.

* * * * *